United States Patent [19]

Ishikawa et al.

[11] Patent Number: 5,436,694
[45] Date of Patent: Jul. 25, 1995

[54] FILM SHEET

[75] Inventors: Masazumi Ishikawa; Toru Tanibata, both of Wakayama, Japan

[73] Assignee: Noritsu Koki Co., Ltd., Wakayama, Japan

[21] Appl. No.: 192,280

[22] Filed: Feb. 4, 1994

[30] Foreign Application Priority Data

Feb. 24, 1993 [JP] Japan ................. 5-035341

[51] Int. Cl.6 ............... A47G 1/06; G09F 1/10; B65D 85/48; G03B 27/62
[52] U.S. Cl. .................... 355/75; 40/159; 40/359; 206/232; 206/455
[58] Field of Search ........ 355/39, 40, 75, 123; 40/156, 159, 159.2, 359; 206/455, 232, 225, 389, 391

[56] References Cited

U.S. PATENT DOCUMENTS

| | | | |
|---|---|---|---|
| 4,247,999 | 2/1981 | Latino | 40/359 |
| 4,720,733 | 1/1988 | Ohtake et al. | 355/50 |
| 4,903,068 | 2/1990 | Shiota | 355/40 X |
| 4,966,285 | 10/1990 | Otake et al. | 206/455 |
| 5,031,773 | 7/1991 | Manico et al. | 206/455 |
| 5,051,773 | 9/1991 | Davis | 355/40 |
| 5,179,409 | 1/1993 | Kazami et al. | 355/75 |
| 5,195,683 | 3/1993 | Gaetano | 229/72 |
| 5,251,746 | 10/1993 | Gresh et al. | 206/232 |
| 5,259,504 | 11/1993 | Manico | 206/455 |
| 5,263,579 | 11/1993 | Blackman | 206/232 |
| 5,301,803 | 4/1944 | Hansen et al. | 206/232 |
| 5,303,825 | 4/1994 | Hansen et al. | 206/232 |
| 5,314,066 | 5/1994 | Gresh | 206/389 |

FOREIGN PATENT DOCUMENTS 0161731 11/1985 European Pat. Off. .

Primary Examiner—Richard A. Wintercorn
Attorney, Agent, or Firm—Armstrong, Westerman, Hattori, McLeland & Naughton

[57] ABSTRACT

A film sheet having a plurality of small pockets wherein a developed film is inserted to be stored, and an index print to which whole numbers of frames in the developed film are printed in numeral order of the developed film inserted in the film sheet. Users can easily search specific film numbers.

2 Claims, 2 Drawing Sheets

FILM SHEET

BACKGROUND OF THE INVENTION

The present invention relates to a film sheet for storing a developed film. More particularly, it relates to a film sheet wherein users can know contents of developed film and film numbers to be specified at first sight.

Conventionally a developed film is divided into some pieces and stored in a film sheet. Users can know contents of the film stored in the film sheet by checking prints, to which the film is printed, one by one, or by holding the film directly to the light.

However, light intensity and hue of the developed film is reverse of those of the printed photographic paper so that users cannot easily know images of negatives, especially for colour photograph. When users wish to make additional prints, therefore, it takes much time for them to know the specific image and is difficult to distinguish the specific image among the other images if images similar to the specific image exist in the film. Consequently, wrong film numbers might be selected for additional prints.

It is an object of the present invention to provide a film sheet wherein users can know contents of developed film at first sight and easily distinguish specific film numbers for which users are searching.

SUMMARY OF THE INVENTION

In accordance with the present invention, there is provided a film sheet having a plurality of small pockets wherein a developed film is inserted to be stored, and an index print to which whole numbers of frames in the developed film are printed in numeral order of the developed film inserted in the film sheet.

Preferably, the index print is formed independently from the film sheet and is sticked to the film sheet.

Also, the index print is preferably printed on the film sheet.

According to a film sheet of the present invention, since an index print on which a film stored in the film sheet is printed in numeral order is provided on the film sheet, users can know contents of the film stored in the film sheet at first sight and easily distinguish specific film numbers among the other film numbers.

DETAILED DESCRIPTION

Figure 1:
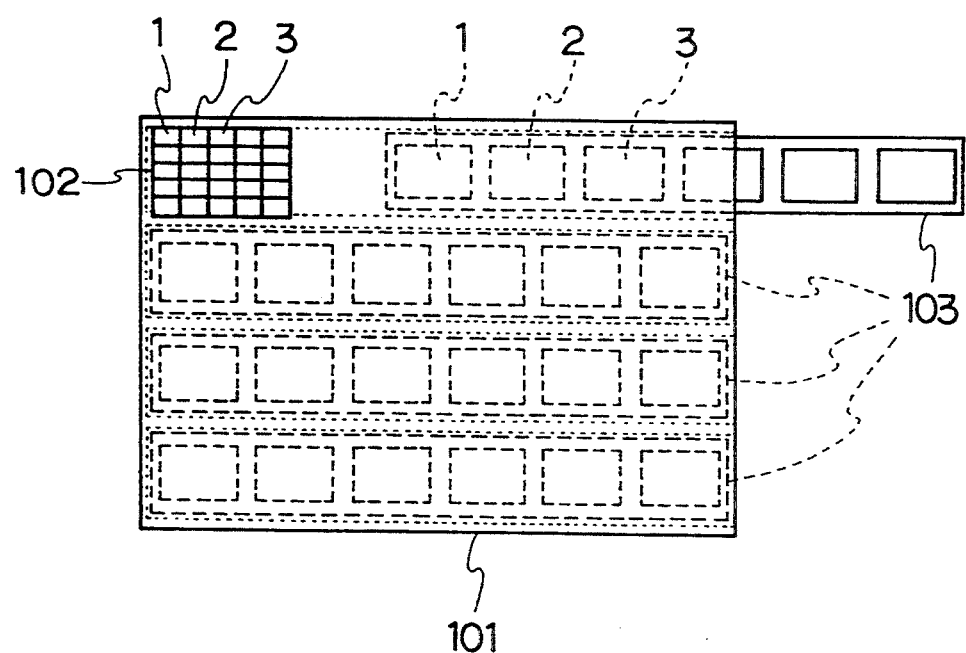
FIG. 1 is an explanatory view of one embodiment of a film sheet of the present invention.

Next, an index print and an film sheet of the present invention is explained with reference to the attached drawings. FIG. 1 is an example of a normal film sheet 101 to which an index print 102 is sticked.

A film 103 is normally cut every six frames and is contained in small pockets of the film sheet 101.

The index print 102 is printed on, for example, the same type of photographic paper as the conventional prints. If the size for printing is the same as that of the conventional prints, operation of a printing apparatus shown in FIG. 2 described later, is simple. However, material for the index print is not restricted to the above example. It is also preferable that the index print is printed on a sheet thinner than the conventional photographic paper such as a sticker. That is, any material can be used as long as it can be rolled or is of sheet-type. Although the size of the material is not limited to a specific size, it is preferably the same size as that of one frame of the film as shown in FIG. 1 so that images of the index print 102 do not appear on the fold of the film sheet 101.

Further, although it is preferable that all the frames of films stored in one film sheet are printed on a sheet of index print, they might be printed on a plurality of index prints.

The image frames 1, 2, 3, . . . n are disposed in the order of film numbers 1, 2, 3, . . . n of the film 103 and are printed on the index print 102. In this case, the film numbers 1, 2, 3, . . . n are preferably stamped on the image frames 1, 2, 3, . . . n.

The index print 102 is stuck to the film sheet 101 with double sided adhesive tapes or adhesives.

It is also possible that the index print 102 is not provided on the film sheet 101, and the same identification number and the like is shown on the index print 102 and the film sheet, to be stored together or separately.

An index print 102 is made by a silver halide photography or a thermal dye sublimation transfer method with a cathode ray tube (CRT).

Figure 2:
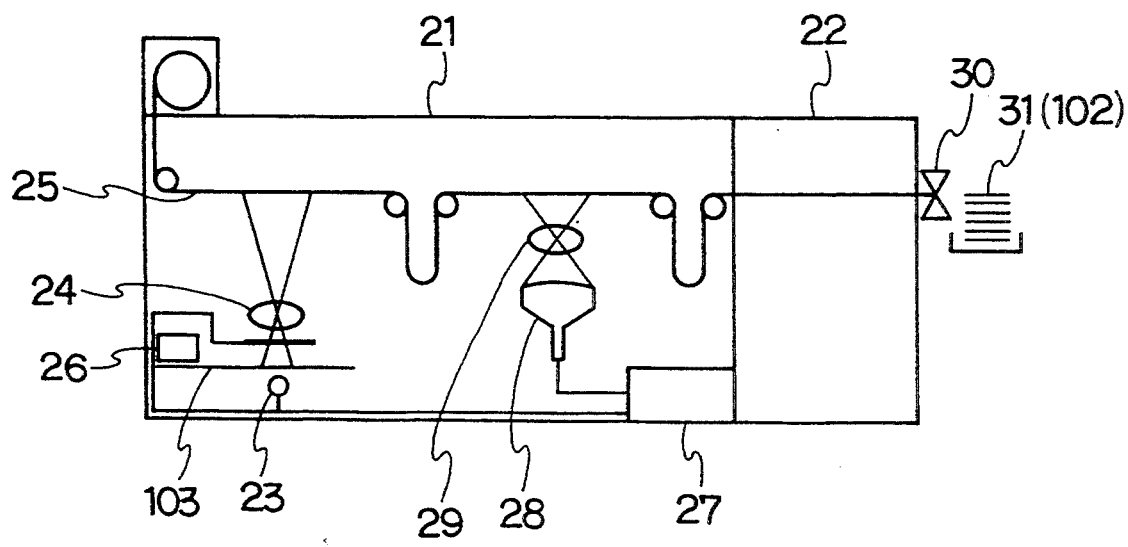
FIG. 2 is a schematic explanatory view of a printing apparatus for making an index print shown in FIG. 1.

One example of a printing apparatus for making index print 102 is explained based on FIG. 2. The printing apparatus comprises a printing part 21 and a developing part 22. Like the conventional printing method, an image of the film 103 is printed on the roll-shaped photosensitive material (hereinafter refer to as "photographic paper") 25 through a lens 24 by light of a lamp 23. Images of each frame of the film 103 are read by a film image reading device 26 and the data is transmitted to a control part 27.

The data of each frame are converted into data for index print at the control part 27 and are printed on the photographic paper through the lens 29 by means of a CRT 28. The printed photographic paper 25 is developed at the developing part 22 in accordance with the conventional method, then cut into prints 31 by means of a cutter 30. In the prints 31, an index print 102 is included besides the conventional printed photographic paper of each frame.

Figure 3:
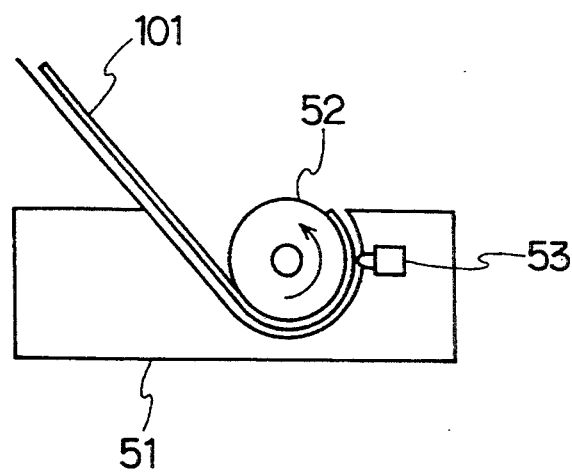
FIG. 3 is a schematic explanatory view of another method for making an index print.

In FIG. 1, the index print is printed on a sheet other than the film sheet and stuck to the film sheet. The index print might be directly printed on the film sheet. In this case, since the film sheet has a double structure i.e. consists of two sheets, pressing of the film sheet results in slippage between upper and lower sheets. Therefore, nonimpact printing methods such as an ink jet printing method are preferably selected. In the nonimpact printing method, as shown in FIG. 3, a film sheet 101 is inserted into a roller 52 of a normal-type ink jet printer 51 and the film sheet 101 is printed by injecting ink from a ink jet nozzle 53 to the film sheet 101. The size of printing can be selected freely, like in the case of the index print of slicked type described above, but it is preferable that images of the index print 102 do not appear on folds of the film sheet 101.

According to the film sheet of the present invention, since the index print wherein frames of the film stored in the film sheet are printed in numeral order of the film is provided to the film sheet, users can know contents of the film stored in the film sheet at first sight and easily distinguish specific film numbers among the other film numbers.

Though several embodiments of the present invention are described above, it is to be understood that the present invention is not limited only to the above-mentioned and various changes and modifications may be made in the invention without departing from the spirit and scope thereof.

What we claim is:

1. A film sheet having a plurality of small pockets wherein a developed film is inserted to be stored, and an index print to which whole numbers of frames in the developed film are printed in numerical order of the developed film inserted in the film sheet, wherein the index print is printed on the film sheet.

2. The film sheet of claim 1, wherein the index print is formed independently from the film sheet and is stuck to the film sheet.

* * * * *